March 17, 1970  A. L. M. FETTWEIS  3,501,593
RESONANT TRANSFER NETWORKS WITH REACTIVE LOADS
Original Filed Nov. 12, 1964  3 Sheets-Sheet 1

3,501,593
Patented Mar. 17, 1970

3,501,593
RESONANT TRANSFER NETWORKS WITH REACTIVE LOADS
Alfred Leo Maria Fettweis, Mol, Belgium, assignor to International Standard Electric Corporation
Continuation of application Ser. No. 410,533, Nov. 12, 1964. This application Sept. 30, 1968, Ser. No. 764,047
Int. Cl. H04j
U.S. Cl. 179—15                           4 Claims

ABSTRACT OF THE DISCLOSURE

Resonant transfer networks terminated in reactive loads are nonetheless made frequency independent by proper selection of ratio of input and load reactances. The transfer characteristic can also be tailored to a desired frequency dependency when such a characteristic is desired to counteract load frequency characteristics.

---

This application is a continuation of 410,533, filed Nov. 12, 1964, now abandoned.

The invention relates to resonant transfer networks with reactive loads including a pair of reactive energy storage devices such as a pair of capacitances which may be effectively and repeatedly interconnected by a network so designed that with a given energy in the first device, obtained from a signal source which may be coupled thereto, at the beginning of an effective interconnecting time, a corresponding amount of energy is stored in the second device at the end of said time.

A resonant transfer network of this type is described for example, in the Proceedings of the Institution of Electrical Engineers (a British publication), September 1958, volume 105, part B, page 449 etc., in an article entitled "Efficiency and Reciprocity in Pulse-Amplitude Modulation," K. W. Cattermole, and more particularly in paragraph (5.5) of this article. With such an arrangement, if the effective interconnecting time of two capacitances of equal values is equal to half the period of natural resonance of the circuit comprising these two capacitances together with the interconnecting network which is most simply realized by way of an inductance, by coupling the first capacitance to a signal source, the instantaneous voltages of the latter may be sampled not on a voltage basis but on an energy basis. Each time that the resonant circuit is established by interconnecting the two capacitances with the help of a gate and through a series inductance, the voltage across the first capacitance is transferred to the second at the end of the interconnecting time and if these times are small when compared to their repetition period, the changes of voltages across the second capacitances may be regarded as practically instantaneous. In other words, a so called box-car waveform is produced across the second capacitance. If the latter is unloaded but connected for instance to the high input impedance of a buffer amplifier, during the time interval between two energy transfers from the first to the second capacitance, the voltage across the latter will remain substantially constant and it may be analyzed, e.g. coded, in any desired manner. As compared to mere voltage sampling, the above energy sampling into a capacitive load offers the advantage that all other things being equal, it is easier to realize a true box-car waveform with flat portions between the instants at which the voltage across the second capacitance is abruptly modified. Indeed, the energy in a capacitance is proportional to the capacitance and to the square of the voltage so that for a given voltage level, the greater the energy, the greater may be the capacitance and in turn this means that for a given relatively high resistance shunting the capacitance, the greater the time constant will be, thus ensuring a flat voltage top across the capacitance.

With the above circuit, the voltage obtained across the second capacitance at the end of the transfer time can be precisely equal to the voltage across the first at the start of this transfer time, provided the two capacitances are of equal value and that there are no resistive elements involved in the resonant transfer circuit. Since the latter necessarily involves at least a series inductance and a gate in practice these two elements will bring in some resistive losses.

The invention is based on the insight that such losses not only cause a reduction of the voltage across the sampling capacitor, which reduction will in general be relatively slight and is not particularly objectionable, but they introduce a frequency distortion in the overall transmission. More particularly, the higher the frequency of the original signal the greater will be the loss caused by the resonant transfer. Such frequency dependent characteristic does not occur when the second capacitance of the resonant transfer circuit is connected to a resistive load through a low-pass filter as will generally be the case for the first capacitance. If when using the energy sampling principle it is desired to avoid a frequency dependent characteristic due to losses of the resonant transfer circuit, by periodically removing the energy from the second capacitor with the help of a clamping circuit it is possible to keep a flat response. While this additional expediture is a satisfactory and in fact essential solution in the case of pulse code modulation systems where the energy sampling process is generally applied with a common capacitance connected to a common PCM coder, i.e. used in time division multiplex fashion for a plurality of signal sources, it is not always necessary or desirable to resort to the use of clamping means, nor in fact possible to do so in some circumstances, i.e. when it is essential to keep the voltage sample across the capacitance until the next exchange of voltages.

A general object of the invention is to obtain a flat frequency response using the resonant transfer principle when the receiving capacitance is substantially unloaded and this despite the resonant transfer circuit normally introducing such a frequency dependent characteristic, e.g. due to resistive losses of the series transfer inductances and of the interconnecting gate or gates.

Although a flat response is generally desired, it may happen that another part of the transmission circuit incircumstances, i.e. when it is essential to keep the voltage desirable to correct. Also, it may purposely be desirable to introduce a frequency dependent characteristic as disclosed for example in the U.S. Patent No. 2,621,-251 where pre-emphasis is introduced at the coding end of a PCM transmission in order to reduce quantization noise, de-emphasis at the decoding end restoring an overall flat characteristic in function of frequency.

Another object of the invention is to obtain a frequency dependent transfer characteristic, particularly one where the response increases as the frequency increases, using the resonant transfer principle with the receiving capacitance substantially unloaded.

In accordance with a characteristic of the invention, the resonant transfer networks with reactive loads as initially defined are characterized by a ratio between the reactances of said storage devices which differs from unity.

In accordance with another characteristic of the invention, said ratio different from unity is chosen in such a way as to obtain a flat frequency response in the transfer characteristic between the two storage devices.

In accordance with another characteristic of the invention, said ratio different from unity is chosen in such a way as to obtain a frequency dependent response particularly one which increases as the frequency increases, in the transfer characteristic between the two storage devices.

In accordance with another characteristic of the invention, resonant transfer networks with reactive loads as specified above are characterized in that the negative of said ratio is equal to the inverse Laplace transform at time $t_1$, where $t_1$ represents the effective interconnecting time of the two storage devices, of the difference between the open circuit impedances at each end of the resonant transfer network including the two storage devices, divided by the product of the differences between the impedances of said storage devices by $p$, the imaginary angular frequency.

In accordance with another feature of the invention, resonant transfer networks with reactive loads as specified above are further characterized in that said storage devices are each constituted by capacitances interconnected at one terminal, that the capacitance forming said second device and constituting said reactive load has a smaller value than that constituting the first storage device and that the negative of said ratio is equal to the ratio between the difference of the voltages across said capacitances at the end of said time $t_1$ and said difference at the start of said time $t_1$.

In accordance with yet another feature of the invention the capacitance constituting said second storage device divided by that constituting the first is equal to $e^{n_1 t_1}$ where $n_1$ is the negative real part of the pair of complex conjugate roots of the resonant transfer network, this ratio corresponding to a flat loss substantially independent of frequency and incurred when transferring a voltage from the first to the second capacitance.

When the sampling capacitor, that is, the capacitor connected to the high input impedance buffer amplifier, is of a lower value than the capacitor that is on the side of the signal source, a flat response is obtained. While the reduction on the magnitude of sampling capacitance entails an energy loss, nonetheless, it enables a voltage to build up on this capacitance which at the end of the transferred time is equal to the voltage originally impressed on the capacitance on the side of the source at the start of the transferred time. When equivalent losses of the resonant transfer circuit are small however as will generally be the case, the flat loss will be relatively unimportant and all the advantages of energy sampling are retained while a distortionless transmission is secured.

The above and other objects and characteristics of the invention as well as the invention itself will be better understood from the following description of a detailed embodiment thereof to be read in conjunction with the accompanying drawings which represent.

Figure 1:
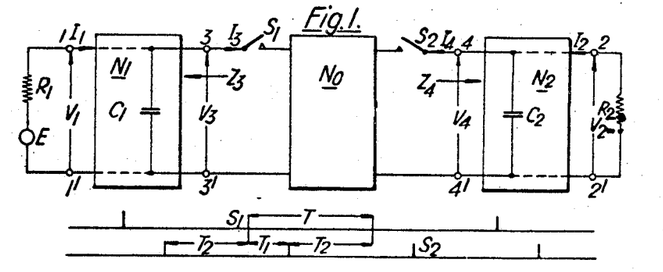
FIG. 1, a general resonant transfer circuit including terminating resistances and useful to explain the theory on which the invention is based.
Figure 3:
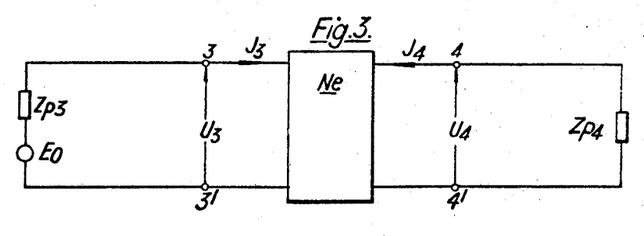
FIG. 3, a so called pulse impedance interconnecting circuit constituting a transposed equivalent of the actual resonant transfer circuit of FIG. 1 and useful to analyze its operation.
Figure 9:
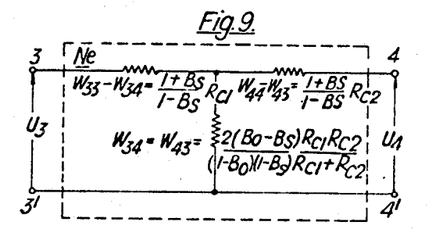
FIG. 9, a T-network representation of the resistive interconnecting network $N_e$ of FIG. 3.

Referring to FIG. 1, the latter shows a general circuit serving to illustrate the resonant transfer principle which will be analyzed hereafter in order to derive a so called pulse impedance interconnecting circuit which is represented in FIG. 3, FIG. 9 representing part of the circuit of FIG. 3 which is shown therein in block diagram form. In turn, this pulse impedance interconnecting circuit will permit to calculate the transmission performance of circuits such as that of FIG. 1. When that part of the resonant transfer circuit which is effective at high frequency (FIG. 4), i.e. during the actual transfer time interval, produces transmission losses, this analysis will permit to show that in the ordinary resonant transfer circuit, when both ends are terminated by resistances (FIG. 1), a flat transfer characteristic can be secured. This is not so however when one of the two capacitive stores of the resonant transfer network is left substantially unloaded by a resistive termination, this normally leading to a transfer characteristic which is frequency dependent unless the ratio between the two capacitances differs from unity in a measure which depends on said losses. More precisely, the unloaded capacitance will have a smaller value than the capacitance on the input side. Although such a choice will permit to secure a transfer characteristic which is flat in function of frequency, this decrease in the value of the output capacitance will nevertheless means an energy loss, but this will be constant irrespective of frequency and provided the losses of the resonant transfer circuit are not high, this additioinal flat loss will be correspondingly slight.

It will also be shown that a frequency dependent characteristic of the resonant transfer circuit, when using an unloaded capacitance, may be secured on purpose if another part of the transmission circuit introduces a loss, e.g. an attenuation increasing with the frequency. In this case, a suitable ratio between the two capacitances will permit to equalize the transmission characteristic. Pre-emphasis may also be secured in the same manner.

In FIG. 1, the blocks $N_1$ and $N_2$ are two 4-terminal networks which are not necessarily the same and which are assumed to contain only constan telements, that is, fixed resistors, inductors and capacitors. On the side of the pair of terminals 3–3' for $N_1$ and on the side of the pair of terminals 4–4' for $N_2$, these two networks $N_1$ and $N_2$ are interconnected by way of series switches, $S_1$ on the side of $N_1$ and $S_2$ on the side of $N_2$, to a network $N_0$ also shown as a block and which may in principle contain additional switches (not shown in FIG. 1) which like $S_1$ and $S_2$ are periodically operated. At its other pair of terminals 1–1', $N_1$ is fed by a source of voltage $Ee^{pt}$ having an internal resistance $R_1$. This source is represented in FIG. 1 merely by its complex amplitude E, and the factor $e^{pt}$ characterizing the frequency of the signal, $p$ being the complex angular frequency parameter and $t$ the time, is also omitted for all other voltages identified in FIG. 1, i.e. $V_1$ across terminals 1–1', $V_3$ across terminals 3–3', $V_4$ across terminals 4–4' and $V_2$ across terminals 2–2' to which is connected the load resistance $R_2$. The input impedance of $N_1$ on the side of terminals 3–3', i.e. next to the switch $S_1$, is designated by $Z_3$ and the corresponding impedance for the network $N_2$ across terminals 4–4' is designated by $Z_4$. These impedances $Z_3$ and $Z_4$ are assumed to become those of pure capacitances $C_1$ and $C_2$ when the frequency becomes sufficiently high. Accordingly, $C_1$ and $C_2$ represented inside the respective networks $N_1$ and $N_2$ by single shunt capacitors across the terminals 3–3' and 4–4' respectively, although they may be composed of a plurality of capacitors included in $N_1$ and $N_2$, may be identified in terms of $Z_3$ and $Z_4$ which are respective functions of $p$ by $$C_1 = \lim_{p \to \infty} \frac{1}{pZ_3(p)} \qquad (1)$$

$$C_2 = \lim_{p \to \infty} \frac{1}{pZ_4(p)} \qquad (2)$$

The network $N_0$ forming the resonant transfer network and which in its simplest form may be constituted by a single series inductance (not shown in FIG. 1) when the two energy storage devices are two capacitances such as $C_1$ and $C_2$ as shown, will be assumed to be such that the voltages across the capacitances are sharply modified during the actual resonant transfer time, e.g. during the time of closure of the switch such as $S_1$ corresponding to the capacitance $C_1$. This is obtained by a resonance phenomenon and in the case of the direct resonant transfer with the switches $S_1$ and $S_2$ closed and opened in unison, as well known, the resonant transfer time $t_1$ during which the switches are closed may be chosen equal to half the natural period of oscillation of the circuit constituted by the inductance and the capacitances $C_1$, $C_2$ in series. If this transfer time $t_1$ is sufficiently small with respect to the repetition period $T$, it can be justifiably assumed that any other current or voltage in the networks $N_1$ and $N_2$ remain practically unchanged during each such brief interconnecting time.

FIG. 1 also shows the times at which the switches $S_1$ and $S_2$ are operated. The recurrence period of the closures is the same for both switches and equal to $T$ but as shown in the timing diagram of FIG. 1, the switch $S_2$ is closed at times which lag by $T_1$ behind the times of closure of the switch $S_1$ or alternatively which lead such closure times by $T_2$, so that $T = T_1 + T_2$.

This is a general timing diagram for the switches $S_1$ and $S_2$ and in fact it corresponds to a resonant transfer circuit using the intermediate storage principle also described for instance in the article previously referred to and more particularly under paragraph (5.4). In a direct resonant transfer circuit, the times of closure of the switches $S_1$ and $S_2$ will coincide so that one of the times such as $T_1$ will be equal to 0 while $T_2$ will be equal to $T$ the repetition period. If intermediate storage is used however, the network $N_0$ may contain additional reactive storage elements as well as additional switches.

Figure 2:
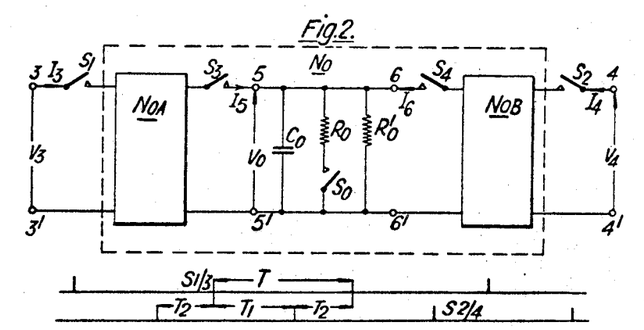
FIG. 2, the actual resonant transfer network $N_0$ shown as a block in FIG. 1 in the particular case of resonant transfer with intermediate storage.

FIG. 2 shows how such a network $N_0$ may be decomposed when using the intermediate storage principle. As shown within a dotted outline, the resonant transfer network $N_0$ connected between the switches $S_1$ and $S_2$ is now decomposed into two resonant transfer networks $N_{0A}$ and $N_{0B}$ which are on the one hand connected to the terminals 3–3' through switch $S_1$ and to terminals 4–4' through switch $S_2$ respectively, and on the other hand interconnected via additional serial switches $S_3$ and $S_4$. Serial switch $S_3$ leads to terminal 5 which is directly interconnected with terminal 6 to which switch $S_4$ is connected. The networks $N_{0A}$ and $N_{0B}$ are further connected on the inside to terminals 5' and 6' respectively, which terminals are also directly interconnected. Between the joint terminal 5, 6 and the joint terminal 5', 6' is an intermediate storage capacitor $C_0$ which is shunted by a resistance $R'_0$ and which represents a leakage resistance. This permits to take into account variations of potential across capacitor $C_0$ when both the switches $S_3$ and $S_4$ are open as shown. Further, by means of the additional switch $S_0$, a further resistance identified by $R_0$ may be coupled across $C_0$ when switch $S_0$ is closed. This further resistance $R'_0$ is not necessarily present in an intermediate storage arrangement but as disclosed in U.S. Patent No. 3,187,100, filed Apr. 24, 1961 it may be constituted by a negative resistance which will help to keep a constant voltage across capacitor $C_0$ during the time intervals when both switches $S_3$ and $S_4$ are open, or even enable an increase of the voltage $V_0$ across $C_0$ in order to secure amplification. The leakage resistance $R'_0$ shown directly connected across $C_0$ in FIG. 2 is generally quite high so that during the intervals of time for which switch $S_0$ is closed the combined parallel resistance across $C_0$ will thus be practically equal to $R_0$ only. At other times, when switch $S_0$ is open, the resistance $R'_0$ can usually be disregarded as sufficiently high.

In the network of FIG. 2, the resonant transfer networks $N_{0A}$ and $N_{0B}$ will respectively permit a direct resonant transfer between the capacitance $C_1$ of FIG. 1 and the intermediate storage capacitor $C_0$ (FIG. 2), and between the latter and the capacitance $C_2$ of FIG. 1. The first case will happen when both switches $S_1$ and $S_3$ are closed simultaneously and the second will take place when both the switches $S_4$ and $S_2$ are closed simultaneously at times which differ from the closure times of the first two switches.

As in FIG. 1, FIG. 2 also shows a timing diagram for such closures and again, the closure times of the switches $S_{2/4}$ lag by $T_1$ behind the closure times of the switches $S_{1/3}$. During at least part of the times $T_1$ and $T_2$, the shunt switch $S_0$ may be closed, e.g. to introduce during repetitive fixed time intervals a resistance $R_0$ of negative value across capacitor $C_0$. It will be noted of course that such times of closure of the switch $S_0$ must not be deemed infinitely short as the time of closures of the switches such as $S_{1/3}$ and $S_{2/4}$. Further, modification of the voltage $V_0$ across intermediate storage capacitor $C_0$ may also occur when switch $S_0$ is closed by a resonant transfer as also disclosed in the U.S. Patent No. 3,187,100.

A general analysis of the circuit of FIG. 1 will now be made, without at first specifying a particular mode of operation, i.e. direct transfer (simultaneous closure of $S_1$ and $S_2$) or intermediate storage transfer (separate closures of $S_1$ and $S_2$).

In what follows, it is assumed that both transfer times, i.e. times of closure of the switches $S_1$ and $S_2$ are infinitely short. With $V_3$ and $V_4$ representing the voltages across $Z_3$, i.e. $C_1$, and $Z_4$, i.e. $C_2$, respectively, the voltages $V_{3b}$ and $V_{4b}$ may be used to identify the corresponding voltages just before the closure of the respective switches $S_1$ and $S_2$, while $V_{3a}$ and $V_{4a}$ may be used to identify the respective voltages immediately after the closures of the switches $S_1$ and $S_2$. Assuming that the elements of the circuit of FIG. 1 and particularly those of the actual resonant transfer network $N_0$ are linear, from a formal viewpoint, the resonant transfer arrangement may be taken mathematically as a means to realize two linear homogeneous independent relations between the magnitudes $V_{3a}$, $V_{3b}$, $V_{4a}$ and $V_{4b}$. These two relations may be written as $$V_{3a} = B_{33}V_{3b} + B_{34}V_{4b} \qquad (3)$$

$$V_{4a} = B_{43}V_{3b} + B_{44}V_{4b} \qquad (4)$$

giving the voltages $V_{3a}$ and $V_{a4}$ explicity in terms of the voltages before the closure of the respective switches, $B_{33}$, $B_{34}$, $B_{43}$ and $B_{44}$ being dimensionless parameters which depend solely on the actual resonant transfer arrangement.

FIG. 1 also indicates the complex magnitudes of the currents $I_1$, $I_2$, $I_3$ and $I_4$ which flow through the corresponding terminals 1, 2, 3 and 4 each time in the direction of the network $N_0$ and the currents $I_3$ and $I_4$ may be defined by $$I_3 = J_3 TD(t) \qquad (5)$$

$$I_4 = J_4 TD(t - T_1) \qquad (6)$$

where $J_3$ and $J_4$ are respective constants having the dimensions of a current and where the function of time $D(t)$ is defined by $$D(t) = \sum_{m=-\infty}^{\infty} d(t-mT) \quad (7)$$

where $m$ is an integer and this function thus corresponds to an ideal train of periodic pulses with a period $T$, the function $d(t)$ being the conventional unit impulse having an ideally short duration and the inverse dimension of the time $t$.

Considering the voltage such as $V_3$ across the impedance $Z_3$, a relation may be established between these two quantities and the impedance by which $-J_3$ (since $V_3$ is taken as positive with respect to terminal 3' and since the current $I_3$ enters $Z_3$ at the terminal) must be multiplied to obtain $V_3$ is independent of $J_3$ and is a function of $t$ with a period $T$. As the Fourier components of (7) have all the same complex amplitude $1/T$, in the absence of a source $E$ one may write $$V_3 = -J_3 \sum_{n=-\infty}^{\infty} Z_3(p+nP)e^{nPt} \quad (8)$$

where $n$ is an integer and $P$ is the imaginary angular sampling frequency, i.e.

$$P = j\frac{2\pi}{T} \quad (9)$$

Evidently, a like relation links $V_4$, $Z_4$ and $J_4$. Since $V_3$ and $V_4$ are functions of $t$ with a period $T$, at any instant of closure of a switch such as $S_1$, when considering $V_3$, the voltages $V_{3b}$ and $V_{3a}$ immediately before and immediately after the considered instant at which the switch $S_1$ closes are independent of this particular instant, although this would not be true of the actual instantaneous amplitudes. Considering the sum as well as the difference of such voltages as $V_{3a}$ and $V_{3b}$, the following relations may be written down $$V_{3a} + V_{3b} = 2U_3 \quad (10)$$

$$V_{4a} + V_{4b} = 2U_4 \quad (11)$$

$$V_{3b} - V_{3a} = 2R_{C1}J_3 \quad (12)$$

$$V_{4b} - V_{4a} = 2R_{C2}J_4 \quad (13)$$

wherein $U_3$ and $U_4$ are new voltage parameters respectively equal to the half sum of the voltages across $Z_3$ and $Z_4$ immediately before and immediately after the closure of the respective switches $S_1$ and $S_2$, while $R_{C1}J_3$ and $R_{C2}J_4$ are the corresponding half difference voltages across $Z_3$ and $Z_4$ respectively, the new parameters $R_{C1}$ and $R_{C2}$ being evidently resistive.

Just as (8) establishes a proportional relation between such voltages as $V_3$ and such currents as $J_3$, like relations may be established this time between the voltages $U_3$ and $U_4$ as defined by (10) and (11) in terms of the respective currents $J_3$ and $J_4$. Calling the ratio between $U_3$ and $-J_3$ (in the absence of a source) the pulse impedance $Z_{p3}$ and with a like pulse impedance $Z_{p4}$ linking $U_4$ and $-J_4$, the following relations may be written down $$U_3 = E_0 - J_3 Z_{p3} = E_0 - J_3 \sum_{n=-\infty}^{\infty} Z_3(p+nP) \quad (14)$$

$$U_4 = -J_4 Z_{p4} = -J_4 \sum_{n=-\infty}^{\infty} Z_4(p+nP) \quad (15)$$

wherein the voltage parameter $E_0$ appearing in (14) will be discussed later. The second-expressions on the right establishing a definition of the so called pulse impedances $Z_{p3}$ and $Z_{p4}$ have been obtained by considering (8) and the like relation linking $V_4$ and $J_4$, as well as a known theorem by which at a point of discontinuity, a Fourier series converges towards the arithmetic mean of its values just before and just after the discontinuity. Considering (14) and (15) the so called pulse impedances $Z_{p3}$, $Z_{p4}$ will be recognized as equivalent to what was introduced in the United States patent application Ser. No. 213,375 filed on July 30, 1962 and assigned to the assignee of this application as the average pulse sequence impedance, itself corresponding to the arithmetic mean of two so called pulse sequence "impedances" previously introduced in the above mentioned article although in the latter, these quantities had in fact the dimensions of impedances divided by the sampling period $T$.

If the impedance such as $Z_3$ is the input impedance of a network which like $N_1$ is fed on the other side by a voltage of which the amplitude is $E$ as indicated in FIG. 1, the voltages just before and just after the closure of the switch such as $S_1$, i.e. $V_{3b}$ and $V_{3a}$, will no longer be directly proportional to the current $J_3$ but they will be linear functions of this current $J_3$, a constant term $E_0$ being introduced for the expressions giving $V_{3b}$ and $V_{3a}$. This is obtained by a direct application of the superposition principle or what amounts to the same thing, Thevenin's theorem in its generalized version. See, for example, p. 74 of "Electronic and Radio Engineering" by F. Terman published by McGraw-Hill, copyright 1955. The voltage $E_0$ appearing in (14) is therefore the open circuit voltage measured across terminals 3–3' and due solely to the voltage $E$ (FIG. 1).

The pulse impedances $Z_{p3}$ and $Z_{p4}$ introduced in (14) and (15) have been defined by these same relations. The resistive parameters $R_{C1}$ and $R_{C2}$ introduced in (12) and (13) can be defined in the following manner. Considering for instance the voltage $V_3$ across the impedance $Z_3$ at an instant when $S_1$ closes for what may be considered an infinitely short time, the product of $C_1$ by the voltage difference $V_{3a} - V_{3b}$ is proportional to the charge brought at that instant by the current $I_3$. Accordingly, by considering (5) the charge $C_1(V_{3a} - V_{3b})$ is equal to $-J_3T$. Therefore the parameters $R_{C1}$ and $R_{C2}$ may be expressed as $$R_{C1} = \frac{T}{2C_1} \quad (16)$$

$$R_{C2} = \frac{T}{2C_2} \quad (17)$$

this by a direct application of (12) and (13).

Due to the relations established so far, it is now possible to introduce a so called pulse impedance interconnecting circuit related to the resonant transfer circuit of FIG. 1 and which will facilitate the analysis of its properties. In this related circuit, instead of the voltages such as $V_3$ and $V_4$ and the currents $I_3$ and $I_4$ which appear in FIG. 1, it is now the voltages $U_3$ and $U_4$ as well as the currents $J_3$ and $J_4$ which are used.

FIG. 3 shows this related pulse impedance interconnecting circuit which uses a pulse impedance 4-terminal interconnecting network labelled $N_e$ having input terminals 3–3' and output terminals 4–4' by analogy with the circuit of FIG. 1. But this time it is the voltage $U_3$ which appears across terminals 3–3' and the voltage $U_4$ which is present across terminals 4–4', while the currents $J_3$ and $J_4$ flow into $N_e$ through the terminals 3 and 4 respectively. The introduction of this 4-terminal interconnecting network is possible due to the fact that from the relations (10), (11), (12) and (13) the voltages $V_{3a}$, $V_{3b}$, $V_{4a}$ and $V_{4b}$ may be replaced into the two linear relations (3) and (4), giving $$U_3 = W_{33}J_3 + W_{34}J_4 \quad (18)$$

$$U_4 = W_{43}J_3 + W_{44}J_4 \quad (19)$$

wherein the impedance parameters $W_{33}$, $W_{34}$, $W_{43}$ and $W_{44}$ together constitute the impedance matrix of the 4- terminal interconnecting network $N_e$ of FIG. 3, and are defined by $$W_{33} = \frac{2 - 2B_{44} - B}{B} R_{C1} \quad (20)$$

$$W_{34} = \frac{2B_{34}}{B} R_{C2} \quad (21)$$

$$W_{43} = \frac{2B_{43}}{B} R_{C1} \quad (22)$$

$$W_{44} = \frac{2 - 2B_{33} - B}{B} R_{C2} \quad (23)$$

wherein B is function of the parameters $B_{33}$, $B_{34}$, $B_{43}$ and $B_{44}$, i.e.

$$B = 1 - B_{33} - B_{44} + B_{33}B_{44} - B_{34}B_{43} \quad (24)$$

Thus for the direct resonant transfer the parameters $W_{33}$ and $W_{43}$ are resistances proportional to $R_{C1}$ while the parameters $W_{34}$ and $W_{44}$ are resistances proportional to $R_{C2}$.

FIG. 3 shows that the terminals 3–3' of $N_e$ are fed by a source of voltage amplitude $E_0$ and of internal impedance $Z_{p3}$. This is a direct result of (14) which also defines the pulse impedance $Z_{p3}$ while $E_0$ was defined as the open circuit voltage amplitude of the network $N_1$ of FIG. 1 when solely fed by the source of voltage amplitude E. Likewise, the pulse impedance $Z_{p4}$ is shown by FIG. 3 to be connected across terminals 4–4', this being justified by (15).

The network of FIG. 3 related to that of FIG. 1 and using the pulse impedances and the interconnecting network will permit to derive expressions for conversion and reflection coefficients which will define the operation of the overall circuit of FIG. 1. In the latter, it will be recalled that all the voltages $V_1$, $V_2$, $V_3$ and $V_4$ are complex amplitudes which depend on the sampling frequency, the multiplying factor $e^{pt}$ having been omitted throughout, this factor affecting the input source shown in FIG. 1 of which only the amplitude E has been indicated. Thus, considering $V_2$ which will be of particular interest in assessing a conversion coefficient for the transmission between terminals 1–1' and 2–2', this can be written as a function of the time $t$ as $$V_2(t) = \sum_{n=-\infty}^{\infty} V_{2n} e^{nPt} \quad (25)$$

wherein P is the imaginary angular sampling frequency previously defined by (9). The current $I_2(t)$ can be defined in exactly the same way as $V_2(t)$, or in other words, one may write $$V_{2n} = -I_{2n} R_2 \quad (26)$$

linking the component of order $n$ contained in $V_2$ with the component of like order contained in $I_2$.

A conversion coefficient of order $n$ may then be defined by analogy with the classical theory for constant parameter networks. In the latter, the square of the modulus of the conversion coefficient may be defined as the ratio between the power in the load resistance, i.e. $R_2$, and the maximum power which can be obtained from the source E. Since the first is equal to the square of the modulus of the voltage component $V_{2n}$ of order $n$ across $R_2$ divided by this resistance, while the second is equal to the square of the modulus of E divided by $4R_1$, a conversion coefficient $S_{21n}$ of order $n$ characterizing the transmission from terminals 1–1' to 2–2' may be defined as $$S_{21n} = 2 \frac{V_{2n}}{E} \sqrt{\frac{R_1}{R_2}} = -2 \frac{I_{2n}}{E} \sqrt{R_1 R_2} \quad (27)$$

where the second expression is immediately obtained by a direct application of (26).

The voltage amplitude $V_1(t)$ expressed also as a function of the time $t$ may evidently be written in the same way as $V_2$ in (25), i.e.

$$V_1(t) = \sum_{n=-\infty}^{\infty} V_{1n} e^{nPt} \quad (28)$$

A reflection coefficient of order $n$, i.e. $S_{11n}$, may then be defined by $$S_{11n} = 2 \frac{V_{1n}}{E} = -2 \frac{I_{1n} R_1}{E} \quad (29)$$

where the second expression in terms of $I_{1n}$ is readily obtained by considering the voltage across terminals 1–1' in FIG. 1, $I_{1n}$ being evidently the complex current amplitude of order $n$ corresponding to the complex voltage amplitude of order $n$. Thus with this definition of the reflection coefficient of order $n$, the latter will be zero when either the corresponding complex voltage amplitude or complex current amplitude is zero. The definition given by (29) is however valid only when $n$ is distinct from 0. In the latter case, the reflection coefficient of order 0, i.e. $S_{110}$, may be written as $$S_{110} = \frac{2V_{10} - E}{E} = \frac{E - 2I_{10} R_1}{E} \quad (30)$$

clearly showing that this particular reflection coefficient will be zero when the complex amplitude voltage $V_{10}$ is equal to $E/2$.

The complex current amplitudes of order $n$ such as $I_{2n}$ and $I_{1n}$ which appear in the second expressions given for (27) and (29) as well as the complex currents amplitude $I_{10}$ which appears in the second expression given by (30) may now be calculated in terms of the equivalent circuit shown in FIG. 3. For the current amplitude $I_{10}$, it should be noted that this consists in the linear superposition of the current due to $J_3$ and that which would be due to the source of amplitude E if the terminals 3–3' were continually open circuited. For the complex current amplitude $I_{1n}$ however this is solely depending on $J_3$, i.e. Equation (5). Thus, $I_{10}$ may be expressed as $$I_{10} = \frac{E}{Z_{11} + R_1} + J_3 M_1(p) \quad (31)$$

where the first term gives the current due to the source I, $Z_{11}$ representing the open-circuit impedance of network $N_1$ measured across terminals 1–1'. The second term is equal to $J_3$ multiplied by $M_1(p)$ which is the current transfer coefficient of the 4-terminal network $N_1$ from terminals 3–3' to terminals 1–1'. When the networks such as $N_1$ and $N_2$ of FIG. 1 are reciprocal, such current transfer coefficients as $M_1(p)$ for $N_1$ are equal to the open-circuit voltage transfer coefficients in the opposite direction, i.e. from terminals 1–1' to terminals 3–3' for $N_1$.

Figure 8:
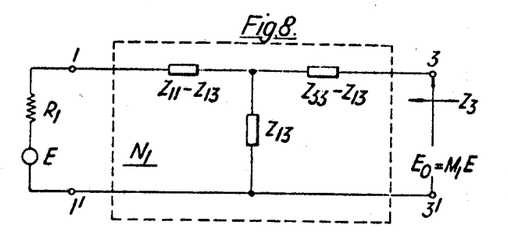
FIG. 8, a T-network representation of the reactive network $N_1$ appearing in FIG. 1.

This well known relation will be quite clear when considering FIG. 8 which represents the network $N_1$ of FIG. 1 as an equivalent reciprocal T-network fed by the source E with its resistance $R_1$ across terminals 1–1' and left open-circuited at terminals 3–3'. With the series impedance branches connected to terminals 1 and 3 respectively labelled $Z_{11}-Z_{13}$ and $Z_{33}-Z_{13}$ and with the shunt branch connected to the directly coupled terminals 1' and 3' labelled $Z_{13}$, it is readily shown that the open-circuit voltage $E_0$ across terminals 3–3' and already referred to in relation to (14) may be expressed in term of E by $$E_0 = M_1 E = \frac{Z_{13}}{Z_{11} + R_1} E \quad (32)$$

wherein the ratio $$\frac{Z_{13}}{Z_{11} + R_1}$$

thus represents either the open-circuit voltage transfer coefficient of $N_1$ from terminals 1–1' to terminals 3–3' or the current transfer coefficient of $N_1$ from terminals 3–3' to terminals 1–1'. For all other complex amplitudes of the currents when the order $n$ is different from 0, the current will have only one term, proportional to $J_3$, i.e.

$$I_{1n} = J_3 M_1(p+nP) \tag{33}$$

The complex amplitudes of the products of order $n$ contained in $I_4$ are given by $J_4 e$, this by referring to (6). Accordingly, $I_{2n}$ is given by $$I_{2n} = J_4 M_2(p+nP)e^{-nPT_1} \tag{34}$$

The equivalent circuit of FIG. 3 now permits to derive expressions for the currents $J_3$ and $J_4$, this with the help of equations (17) and (18) as well as (14) and (15). These currents may thus be written $$J_3 = \frac{E_o(W_{44}+Z_{p4})}{(W_{33}+Z_{p3})(W_{44}+Z_{p4}) - W_{34}W_{43}} \tag{35}$$

$$J_4 = \frac{-E_o W_{43}}{(W_{33}+Z_{p3})(W_{44}+Z_{p4}) - W_{34}W_{43}} \tag{36}$$

and the conversion coefficient identified by (27) as well as the reflection coefficients identified by (29) and (30) can now be expressed in terms of the pulse impedances $Z_{p3}$ and $Z_{p4}$, the W parameters and the coefficients $M_1(p)$ and $M_2(p+nP)$, this with the help of such equations as (34) and (36) when applied to find a modified expression for $S_{21n}$ given by (27). For this conversion coefficient of order $n$ from terminals 1–1' to terminals 2–2', equation (27) thus becomes $$S_{21n} = \frac{2\sqrt{R_1 R_2} W_{43} M_1(p) M_2(p+nP) e^{-nPT_1}}{(W_{33}+Z_{p3})(W_{44}+Z_{p4}) - W_{34}W_{43}} \tag{37}$$

The interconnecting network $N_e$ of FIG. 3 will now be more specifically identified in terms of the actual resonant transfer network $N_0$ and the capacitances $C_1$ and $C_2$ of FIG. 1 by considering the particular case of the direct resonant transfer. For the direct resonant transfer system, the network $N_0$ of FIG. 1 is without memory so that there is no stored energy in this network at the beginning of a transfer period. Moreover, the case of the direct resonant transfer means that the two switches $S_1$ and $S_2$ operate simultaneously and remain closed during precisely the same time interval, i.e. $t_1$.

The absence of energy in the network $N_0$ at the beginning of each transfer period when the switches $S_1$ and $S_2$ are simultaneously closed, i.e. with $T_1$ of FIG. 1 equal to zero may be secured in various ways. A first possibility is to realize the network $N_0$ in such a way that all its elements, e.g. the highway capacitance, are exactly discharged at the end of the transfer period when the two switches $S_1$ and $S_2$ are reopened, so that they will certainly also be discharged at the beginning of the next transfer interval. A second method consists in realizing the network so as to cause a practically instantaneous discharge from the opening of the switches, or in any event a practically complete discharge between the end of a transfer period and the beginning of the next. Finally, a third method consist in foreseeing inside $N_0$ auxiliary switches which cause the desired discharge during a period of time suitably chosen between two successive transfer periods. In this case there is nearly always an advantage in operating these auxiliary switches in a periodic manner just as $S_1$ and $S_2$. This is however not strictly necessary since the overall result is the same as soon as the discharge is complete at the beginning of the next transfer period.

The first of these three methods is the more interesting since it is not accompanied by a loss of energy. It is not however possible to realize it perfectly due to the inevitable tolerances on the values of the elements as well as on the timing for the closure of the switches $S_1$ and $S_2$. For this reason, in practice a combination of the first with at least one of the other two methods will be used.

For such a direct resonant transfer arrangement it is now possible to calculate general expressions for the dimensionless B parameters appearing in the relations (3) and (4).

Figure 4:
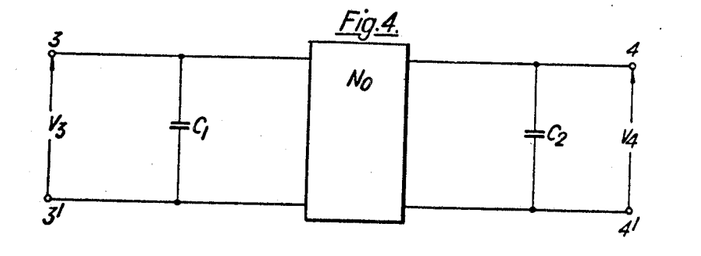
FIG. 4, that part of the circuit of FIG. 1 which is effective at high frequency.

Referring to FIG. 4, the latter shows the 4-terminal network $N_0$ of FIG. 1 when the switches $S_1$ and $S_2$ which are not shown in FIG. 4 are closed so that the two capacitances $C_1$ and $C_2$ respectively across terminals 3–3' and terminals 4–4' are now also directly in shunt across the two ends of $N_0$.

It is clear that at high frequency, the network $N_0$ cannot be capacitive at its input and output across terminals 3–3' and 4–4', since otherwise a controlled lossless resonant transfer from capacitance $C_1$ to capacitance $C_2$ and vice-versa would be excluded. Thus, at high frequency for the resonant transfer, the 4-terminal network of FIG. 4 is constituted at the terminals 3–3' solely by the capacitance $C_1$ and likewise at the terminals 4–4' solely by the capacitance $C_2$. Hence, the analysis of the complete circuit of FIG. 4 may be performed by assuming that at the instant the switches are closed, ideal impulses of infinitely short duration, of infinitely large amplitude and of moment $v_{3b} C_1$ and $v_{4b} C_2$ are applied across terminals 3—3' and 4–4' respectively. Indeed, if $v_{3b}$ and $v_{4b}$ represent the instantaneous voltages before the closure of the switches $S_1$ and $S_2$ and thus corresponding to the voltage amplitudes $V_{3b}$ and $V_{4b}$ so far considered, these ideal impulses will instantly carry the instantaneous voltages across terminals 3–3' and 4–4' to the respective required values. The instantaneous voltages $v_{3a}$ and $v_{4a}$ corresponding to the voltages $V_{3a}$ and $V_{4a}$ so far considered are related to the instantaneous voltages $v_{3b}$ and $v_{4b}$ by two linear equations which have coefficients depending on the characteristics of the complete network of FIG. 4. More precisely, since it has been assumed that the network $N_0$ was without energy at the instant the switches were closed the instantaneous voltages $v_{3a}$ and $v_{4a}$ can be computed in terms of the inverse Laplace transforms at time $t_1$, i.e. the transfer time during which the switches are closed, of the impedance matrix elements of the complete network of FIG. 4. The coefficients by which the instantaneous voltages $v_{3b}$ and $v_{4b}$ must be multiplied to produce the instantaneous voltages $v_{3a}$ and $v_{4a}$ by linear combinations are the parameters $B_{33}$, $B_{34}$, $B_{43}$ and $B_{44}$ of equations (3) and (4) since all the instantaneous voltages such as $v_{3a}$ are related to the corresponding voltage amplitude $V_{3a}$ by the same proportionality factor. Thus, for the direct resonant transfer system when $N_0$ is without energy at the time of each transfer interval and calling $L_{t_1}^{-1}$ the inverse Laplace transform at time $t_1$, the parameters $B_{33}$, $B_{34}$, $B_{43}$ and $B_{44}$ are given by $$B_{33} = C_1 L_{t_1}^{-1}(Z_{33}) \tag{38}$$

$$B_{34} = C_2 L_{t_1}^{-1}(Z_{34}) \tag{39}$$

$$B_{43} = C_1 L_{t_1}^{-1}(Z_{43}) \tag{40}$$

$$B_{44} = C_2 L_{t_1}^{-1}(Z_{44}) \tag{41}$$

The 4-terminal complete network of FIG. 4 is reciprocal which means that out of the four impedances defining its impedance matrix and appearing in the above four equations, i.e. $Z_{33}$, $Z_{44}$, $Z_{34}$ and $Z_{43}$, the last two are equal to another. In view of (39) and (40) this means that $B_{34}/B_{43}$ is equal to $C_2/C_1$ and in turn, in view of (16) and (17), equal also to $R_{C1}/R_{C2}$. Accordingly, for the direct resonant transfer, by considering (20) and (21), when the 4-terminal complete network of FIG. 4 is reciprocal, i.e. $Z_{34}=Z_{43}$, the equivalent resonant transfer network $N_e$ of FIG. 3 is also reciprocal, i.e. $W_{34}=W_{43}$. Since the parameters B are now defined by the equations (38), (39), (40) and (41) the resistive parameters W expressed by (19), (20), (21) and (22) can be calculated. These are pure resistances directly proportional either to $R_{C1}$ (for $W_{33}$ and $W_{43}$) or to $R_{C2}$ (for $W_{34}$ and $W_{43}$).

The relations between the resistive parameters of the equivalent resonant transfer network $N_e$ of FIG. 3 and those of the complete overall network of FIG. 4 comprising the network $N_0$ associated with the shunt capacitances $C_1$ and $C_2$ can be facilitated by considering alternative representations for the network of FIG. 4.

Figure 5:
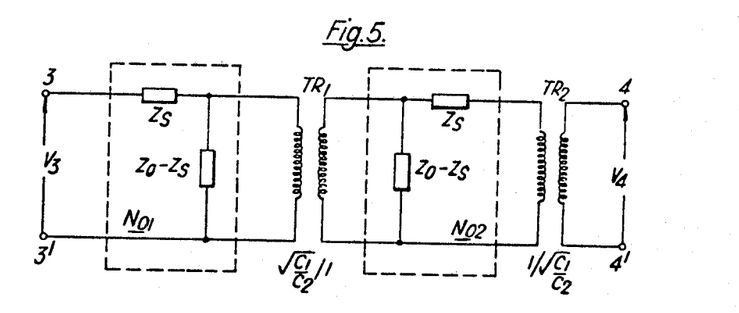
FIG. 5, a circuit equivalent to the general circuit of FIG. 4 using a pair of like L-networks.

FIG. 5, shows a circuit equivalent to that of FIG 4 and which comprises the association obtained by inserting between terminals 3—3' and 4—4' a cascade arrangement of two like 4-terminal networks $N_{01}$ and $N_{02}$, the second being however reversed in direction with regard to the first and being inserted between two ideal transformers $TR_1$ and $TR_2$ having a voltage ratio equal to $C_1/C_2$ as will be justified later. While these two ideal transformers are identical, they are coupled in opposite ways, i.e. as step-up and step-down transformers respectively, so that any impedance present at either the terminals 3–3' or 4–4' is seen unchanged across the other pair of terminals 4—4' or 3—3'. The two networks $N_{01}$ and $N_{02}$ are identical L-networks each comprising a series impedance $Z_S$ followed by a shunt impedance $Z_0-Z_S$ so that $Z_0$ and $Z_S$ represent respectively the open-circuit and short-circuit impedances of the network such as $N_{01}$ measured on the side of the series impedance $Z_S$ away from the shunt impedance $Z_0-Z_S$.

Figure 6:
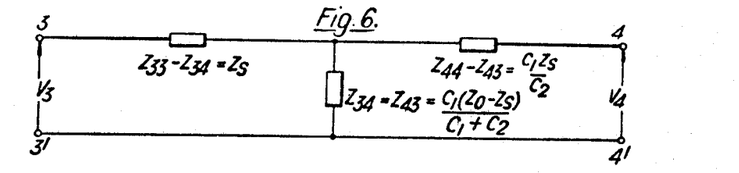
FIG. 6, a T-network equivalent to the circuit of FIG. 5.

The 3-parameter, i.e. $Z_0$, $Z_S$ and $C_1/C_2$, reciprocal network of FIG. 5, can be readily transformed into the equivalent T-network of FIG. 6 by eliminating the ideal transformers $TR_1$ and $TR_2$ of FIG. 5. The impedance parameters $Z_{33}$, $Z_{34}$, $Z_{43}$ and $Z_{44}$ of the networks of FIGS. 4, 5 and 6 are therefore identified by $$Z_{33}-Z_{34}=Z_S \tag{42}$$

$$Z_{44}-Z_{43}=\frac{C_1 Z_S}{C_2} \tag{43}$$

$$Z_{34}=Z_{43}=\frac{C_1(Z_0-Z_S)}{C_1+C_2} \tag{44}$$

Bearing in mind that at high frequency, not only must the open circuit impedance $Z_0$ measured at terminals 3–3' be equal to that of the capacitance $C_1$ but also the short circuit impedance $Z_S$ and that such impedances measured at high frequency across terminals 4–4' must necessarily be $$\frac{C_1 Z_0}{C_2}$$

and $$\frac{C_1 Z_S}{C_2}$$

respectively, it is clear that the choice of $$\sqrt{\frac{C_1}{C_2}}$$

for the voltage ratios of the ideal transformers $TR_1$ and $TR_2$ as shown in FIG. 5 is justified.

The network of FIG. 6 thus constitutes a general representation of a reciprocal 4-terminal network, with the sole restriction that the two series arms are impedances of like nature since at high frequency, when both $Z_0$ and $Z_S$ are reduced to the impedance of $C_1$ the ratio between the impedances of these two series arms, i.e. $Z_{33}-Z_{34}$ and $Z_{44}-Z_{43}=Z_{44}-Z_{34}$, should be that between $C_2$ and $C_1$.

Figure 7:
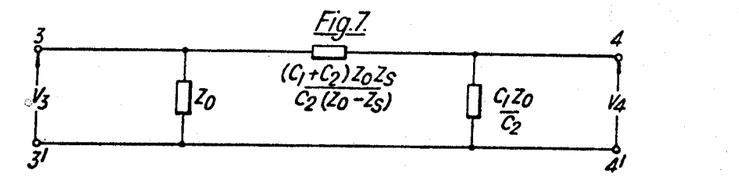
FIG. 7, a $\pi$-network equivalent to the T-network of FIG. 6.

FIG. 7 represents a $\pi$-network equivalent to the T-network of FIG. 6 and may be readily obtained from the latter by conventional transformations or by starting from a circuit analogous to that of FIG. 5 but wherein the networks $N_{01}$ and $N_{02}$ are reversed, e.g. for $N_{01}$ the shunt impedance $Z_0-Z_S$ is now directly in shunt across terminals 3–3'. The network of FIG. 7 facilitates the identification of $Z_0$ and $Z_S$ with the actual elements of the complete resonant transfer network of FIG. 4 and for the simpler resonant transfer circuit of the direct type it is readily seen that $Z_0$ identifies itself with $1/pC_1$, the impedance of the capacitance $C_1$.

Making use of the inverse Laplace transforms at time $t_1$ of the impedances $Z_0$ and $Z_S$ so defined and of (42), (43), (44), the parameters identified by (38) to (41) can now be expressed at $$B_{33}=\frac{C_1 B_0+C_2 B_S}{C_1+C_2} \tag{45}$$

$$B_{34}=\frac{C_2(B_0-B_S)}{C_1+C_2} \tag{46}$$

$$B_{43}=\frac{C_1(B_0-B_S)}{C_1+C_2} \tag{47}$$

$$B_{44}=\frac{C_2 B_0+C_1 B_S}{C_1+C_2} \tag{48}$$

where the new parameters $B_0$ and $B_S$ are given by $$B_0=B_{33}+B_{34}=B_{43}+B_{44}=C_1 L_{t_1}^{-1}(Z_0) \tag{49}$$

$$B_S=B_{33}-B_{43}=B_{44}-B_{34}=C_1 L_{t_1}^{-1}(Z_S)$$

$$=L_{t_1}^{-1}\left(\frac{Z_{33}-Z_{44}}{\frac{1}{C_1}-\frac{1}{C_2}}\right) \tag{50}$$

which not only define the parameters $B_0$ and $B_S$ as inverse Laplace transforms of $Z_0$ and $Z_S$ respectively each multiplied by $C_1$, but also give a relation between the four parameters $B_{33}$, $B_{34}$, $B_{43}$ and $B_{44}$ due to the networks of FIGS. 5, 6 and 7 being reciprocal, i.e. $Z_{34}=Z_{43}$. This condition between these four parameters permits to write a new expression for the parameter B given by (23), in function of $B_0$ and $B_S$, i.e.

$$B=(1-B_0)(1-B_S) \tag{51}$$

Additionally, (50) expresses $B_S$ as a function of $Z_{33}-Z_{44}$, this by using (42), (43) and (44).

Returning to the conversion coefficient of order $n$, i.e. $S_{21n}$ defined by (37) and specifying the transmission from terminals 1–1' to terminals 2–2' for any component of the various sidebands which are obtainable at the output of $N_2$ (FIG. 1) depending on the passband of the latter, the parameters $W_{33}$, $W_{34}$, $W_{43}$ and $W_{44}$ appearing in (37) and defined by (19) to (22) can be expressed in terms of the $B_0$ and $B_S$ dimensionless coefficients. On the other hand the open circuit voltage transfer coefficients $M_1$ and $M_2$ also appearing in (37) can be expressed in terms of the resistive part of the impedances $Z_3$ and $Z_4$ respectively and in terms of the respective terminating resistances $R_1$ and $R_2$. This last can best be explained in relation to FIG 8.

Considering FIG. 8 already described in relation to (32) defining the open circuit voltage $E_0$ at terminals 3–3' and assuming that $p$ is a pure imaginary angular frequency so that $\omega=jp$ is real, the square of the coefficient $M_1$ may in view of this last equation be expressed as $$M_1^2=\frac{Z_{13}}{Z_{11}+R_1}\frac{Z_{13}}{Z_{11}-R_1}\frac{Z_{11}-R_1}{Z_{11}+R_1} \tag{52}$$

giving $M_1^2$ as a product of three factors, the last of which can be recognized as the reflection coefficient at terminals 1–1', i.e. $h_1$ given by $$h_1=\frac{Z_{11}-R_1}{Z_{11}+R_1} \tag{53}$$

If the network $N_1$ is purely reactive as is usually the case, $Z_{11}$, $Z_{13}$ and $Z_{33}$ are all purely reactive and accordingly the second factor of (52) represents the complex conjugate $\overline{M}_1$ of $M_1$. Thus (52) may be written as $$M_1^2=M_1\overline{M}_1 h_1 \tag{54}$$

If the impedances of $N_1$ are purely reactive, the input impedance $Z_3$ measured across terminals 3–3' in the direction of $N_1$ may be written as $$Z_3 = Z_{33} - Z_{13} + \frac{Z_{13}(R_1 + Z_{11} - Z_{13})}{R_1 + Z_{11}}$$

$$= jX_{33} - jX_{13} + \frac{jX_{13}(R_1 + jX_{11} - jX_{13})}{R_1 + jX_{11}}$$

$$= R_3 + jX_3 \quad (55)$$

in which the second expression for $Z_3$ is readily obtained by replacing each impedance such as $Z_{33}$ in function of the corresponding reactance such as $jX_{33}$ and wherein the third expression for $Z_3$ identifies its resistive part as $R_3$ and its reactive part as $X_3$. By transforming the second expression for $Z_3$, the value of $R_3$ is found to be $$R_3 = \frac{X_{13}^2}{R_1^2 + X_{11}^2} R_1 = M_1 \overline{M}_1 R_1 \quad (56)$$

In association with (54) the latter thus gives $$M_1^2 = \frac{R_3}{R_1} h_1 \quad (57)$$

and since by virtue of $Z_{11}$ being purely reactive, i.e. equal to $jX_{11}$, the modulus of $h_1$ is equal to unity, this means that the square of the modulus of $M_1$ can be expressed directly as the ratio of $R_3$ and $R_1$ i.e.

$$|M_1|^2 = \frac{R_3}{R_1} \quad (58)$$

A like expression can be secured for the square of the modulus of $M_2$ which is thus equal to the ratio between $R_4$, the resistive part of $Z_4$, and $R_2$, the terminating resistance across terminals 2–2'. But it should be remembered that whereas $R_3$ is a function of $\omega$, $R_4$ will be a function of $$\omega + \frac{2\pi n}{T}$$

as is clear from (37).

In order to transform this expression giving $S_{21n}$, it is still necessary to have the parameters $W_{33}$, $W_{34}$, $W_{43}$ and $W_{44}$ expressed in terms of the dimensionless coefficients $B_S$ and $B_0$ as well as the resistances $R_{C1}$ and $R_{C2}$ previously defined.

FIG. 9 shows the equivalent resonant transfer network $N_e$ introduced in FIG. 3, in the form of a T-network of which the series resistances are $W_{33} - W_{34}$ on the side of terminal 3 and $W_{44} - W_{43}$ on the side of terminal 4. The shunt resistance is $W_{34} = W_{43}$ by virtue of the equivalent network $N_e$ being reciprocal as previously explained. Making use of the Equations 45 to 48 and 51 into 19 to 22, these three resistances shown in FIG. 9 can be expressed as $$W_{33} - W_{34} = \frac{1 + B_S}{1 - B_S} R_{C1} \quad (59)$$

$$W_{44} - W_{43} = \frac{1 + B_S}{1 - B_S} R_{C2} \quad (60)$$

$$W_{34} = W_{43} = \frac{2(B_0 - B_S)}{(1 - B_0)(1 - B_S)} \frac{R_{C1} R_{C2}}{R_{C1} + R_{C2}} \quad (61)$$

It is now possible to obtain a very simple expression for the conversion coefficient of order $n$, i.e. $S_{21n}$ given by (37) and particularly in the case of the direct resonant transfer for which the exponential term contained in this last expression disappears since $T_1$ (FIG. 1) is equal to 0 as the two switches $S_1$ and $S_2$ are simultaneously operated.

Considering the equivalent circuit of FIG. 3 with the structure of $N_e$ given by the T-network of FIG. 9, the ideal situation is to have this last network reduced to mere interconnections between terminals 3 and 4 on the one hand and terminals 3' and 4' on the other. In this case the open circuit voltage source $E_0$ of FIG. 3 is merely feeding the two pulse impedances $Z_{p3}$ and $Z_{p4}$ in series. These two pulse impedances can be decomposed into a resistive and a reactive part such as $R_{p3}$ and $jX_{p3}$ for $Z_{p3}$ and the resistive part $R_{p3}$ of the pulse impedance $Z_{p3}$ can be expressed in function of the resistive part $R_3$ of $Z_3$ in the same way as Equation 14 gives the pulse impedance $Z_{p3}$ as a series expressed in terms of $Z_3$, i.e.

$$R_{p3} = \sum_{n=-\infty}^{\infty} R_3\left(\omega + \frac{2\pi n}{T}\right) \geq R_3(\omega) \quad (62)$$

As expressed by the above, $R_{p3}$ must be at least equal to $R_{p3}(\omega)$ representing the resistive part of the impedance $Z_3$. A like reasoning can be made for the resistive part $R_{p4}$ of the pulse impedance $Z_{p4}$ which must at least be equal to $$R_4\left(\omega + \frac{2\pi n}{T}\right)$$

representing the resistive part of the impedance $Z_4$.

As stated before, in the ideal conditions, the network of FIG. 9 should disappear to permit a direct interconnection between the pulse impedances $Z_{p3}$ and $Z_{p4}$ in FIG. 3 and these conditions will be attained when $W_{33}$, $W_{34} = W_{43}$ and $W_{44}$ are equal to one another and in fact infinite since the two series branches of the T-network of FIG. 9 can be replaced by a short-circuit when $B_S = -1$ while the shunt branch can be replaced by an open circuit when $B_0$ is equal to 1. Considering (37), in such a case, by dividing both the numerator and the denominator by $W_{43}$, only $Z_{p3} + Z_{p4}$ will be left in the denominator. For a maximum value of $S_{21n}$ this denominator should be minimum and this will be the case if both the resistive part of $Z_{p3} + Z_{p4}$ and the reactive part of this combined pulse impedance are minimized. This will be true when $$R_{p3} = R_3(\omega) \quad (63)$$

$$R_{p4} = R_4\left(\omega + \frac{2\pi n}{T}\right) \quad (64)$$

$$X_{p3} = -X_{p4} \quad (65)$$

are satisfied, (63) and (64) in view of the minimum value for the resistive part such as $R_{p3}$ being equal to $R_3(\omega)$ as shown by (62).

If the above three relations are satisfied in addition to (58) and a like relation for the modulus of $M_2$, by replacing into (37) it is found that the modulus of $S_{21n}$ may reach a maximum value of unity when $R_3$ is equal to $R_4$. Filters such as the networks $N_1$ and $N_2$ of FIG. 1 which satisfy such conditions may therefore be termed ideal filters and more specifically ideal filters for single sideband modulation by direct resonant transfer since the direct resonant transfer is the particular case which has been considered immediately above while it is also a single sideband modulation which has been envisaged. Otherwise, for double sideband modulation one would have to consider two conversion coefficients $S_{21,n}$ and $S_{21,-n}$ of order $n$ and $-n$ respectively whose moduli should be equal to another.

Consideration will now be given to the value of the conversion coefficient $S_{21n}$ in the case of intermediate storage resonant transfer. For important practical applications of the resonant transfer principle in telecommunication exchanges, it may be desirable that some communications established by any given station should be made in accordance with the direct resonant transfer principle while others should be made following the intermediate storage principle. When considering also intermediate storage resonant transfer, instead of ideal filters satisfying (63) (64) and (65), so called universal ideal filters can then be defined. These have the further properties that both $R_{p3}$ and $R_{p4}$ are equal to the same constant resistance while both $X_{p3}$ and $X_{p4}$ are equal to zero. This will be shown below.

Considering FIG. 2 which has already been referred to and which describes the resonant transfer network $N_0$ in more detail in the case of an intermediate storage transmission, the amplitudes $I_3$ and $I_4$ of the currents entering the networks $N_{0A}$ and $N_{0B}$ through the switches $S_1$ and $S_2$ respectively are still given by (5) and (6). Likewise, the amplitudes $I_5$ and $I_6$ of the currents flowing respectively through terminals 5 and 6 towards the centre of the network and formed in like manner by modulated pulse trains can be defined by $$I_5 = J_5 TD(t) \tag{66}$$

$$I_6 = J_6 TD(t-T_1) \tag{67}$$

While $V_0$ designates the voltage amplitude across the intermediate storage capacitance $C_0$, the value of $V_0$ just before the arrival of a pulse of $I_5$ due to the closure of switch $S_3$ can be designated by $V_{5b}$ and in like manner $V_{5a}$ can be used to identify the value of $V_0$ immediately after such a pulse. In a similar fashion, $V_{6b}$ and $V_{6a}$ can identify the values of this same voltage amplitude $V_0$ just before and just after the arrival of a pulse of $I_6$ through terminal 6, i.e. upon switch $S_4$ being closed. Keeping the same previous definitions for the voltage amplitudes $V_{3a}$, $V_{3b}$, $V_{4a}$ and $V_{4b}$, it is clear that the previous analysis establishing relations between these four voltage amplitudes on each side of network $N_0$, e.g. (3) and (4) and derivations thereof, remain valid in the case of the corresponding voltages on each side of the network $N_{0A}$ as well as for the corresponding voltages on each side of the network $N_{0B}$. In the case of the network $N_{0A}$, the relations will be between the voltage amplitudes $V_{3a}$, $V_{5a}$, $V_{3b}$, and $V_{5b}$, whereas for the network $N_{0B}$, the relations will be between the voltages $V_{4a}$, $V_{6a}$, $V_{4b}$ and $V_{6b}$.

Additional relations of the type given by (10), (11), (12) and (13) may also be written, this time in connection with the voltage amplitudes $V_{5a}$, $V_{5b}$, $V_{6a}$ and $V_{6b}$. These are $$V_{5a} + V_{5b} = 2U_5 \tag{68}$$

$$V_{6a} + V_{6b} = 2U_6 \tag{69}$$

$$V_{5a} - V_{5b} = 2R_{C0} J_5 \tag{70}$$

$$V_{6a} - V_{6b} = 2R_{C0} J_6 \tag{71}$$

these last two by taking into account currents $J_5$ and $J_6$ (not shown) flowing in directions corresponding to those of $I_5$ and $I_6$ respectively and by remarking that $V_{5a} - V_{5b}$ and $V_{6a} - V_{6b}$ can only depend on $I_5$ and $I_6$ respectively. The first two above relations introduce the auxiliary voltage parameters $U_5$ and $U_6$ and the last two introduce also the resistance $R_{C0}$ which in the same manner as $R_{C1}$ and $R_{C2}$, i.e. Equations 16 and 17 is given in function of the capacitance $C_0$ by $$R_{C0} = \frac{T}{2C_0} \tag{72}$$

Remembering that the switches $S_1$ and $S_3$ close in unison and that is also true for the switches $S_2$ and $S_4$ but with a time lag equal to $T_1$ or in other words that the closure of the switches $S_2$ and $S_4$ leads the closure of the switches $S_1$ and $S_3$ by a time equal to $T_2$ since $T_1 + T_2$ is equal to the sampling period $T$, expressions for the voltage amplitudes $V_{5b}$ and $V_{6b}$ immediately before the closure of the respective switches $S_3$ and $S_4$ can be derived. Such voltage amplitudes immediately before the closure of the switches, i.e. $V_{5b}$ and $V_{6b}$ will be directly proportional to the respective voltage amplitudes immediately after the closure of the opposite switch, i.e. $V_{6a}$ and $V_{5a}$ respectively, i.e.

$$V_{5b} = V_{6a} e^{-pT_2 - a_2} \tag{73}$$

$$V_{6b} = V_{5a} e^{-pT_1 - a_1} \tag{74}$$

Since FIG. 2 shows resistances such as $R'_0$ permanently connected across capacitance $C_0$ and corresponding to the leakage resistance as well as another resistance $R_0$ which may be temporarily connected across such a capacitance when the switch $S_0$ is closed, the above equations show exponential terms which include not only a term $-pT_2$ or $-pT_1$ respectively corresponding to the time delay in the operation of the switches $S_3$ and $S_4$, but in addition a term $-a_2$ or $-a_1$ corresponding to the attenuation produced by such resistances during the time interval separating the closure of the switch $S_3$ from the closure of the switch $S_4$ and vice versa. Clearly, during the time that $S_0$ is closed the time constant for the intermediate storage capacitance $C_0$ will be equal to the product of that capacitance by the parallel combination of the resistances $R_0$ and $R'_0$ while during the rest of the time interval separating the closure of a switch $S_3$ from the closure of a switch $S_4$, while switch $S_0$ remains open, it will be equal to the product of $C_0$ solely by the resistance $R'_0$. Accordingly, such constants as $a_2$ and $a_1$ appearing (73) and (74) are readily calculated by dividing the corresponding time intervals by the time constants.

Two linear relations corresponding to (18) and (19) may now be established this time between the voltages $U_5$ and $U_6$ and the currents $J_5$ and $J_6$, with the help of (68), (69), (70), (71), (73) and (74). These are $$U_5 = W_{55} J_5 + W_{56} J_6 \tag{75}$$

$$U_6 = W_{65} J_5 + W_{66} J_6 \tag{76}$$

wherein the impedance parameters $W_{55}$, $W_{56}$, $W_{65}$ and $W_{66}$ are identified by $$W_{55} = W_{66} = R_{C0} \coth \frac{pT + a_1 + a_2}{2} \tag{77}$$

$$W_{56} W_{65} = R_{C0}^2 \csch^2 \frac{pT + a_1 + a_2}{2} \tag{78}$$

$$\frac{W_{56}}{W_{65}} = e^{-p(T_2 - T_1) - (a_2 - a_1)} \tag{79}$$

Accordingly, the arrangement connected between the terminals 5–5' and 6–6' of FIG. 2 corresponds a transposed equivalent quadripole in the same way as the equivalent network $N_e$ of FIG. 3 corresponds to the actual resonant transfer network $N_0$ of FIG. 1, and as indicated by (77), this transposed equivalent 4-terminal network (not shown) is symmetrical since its impedance parameters $W_{55}$ and $W_{66}$ are equal to one another. On the other hand, such a transposed equivalent network or pulse impedance interconnecting network as previously defined in relation to FIG. 3 is not generally reciprocal since this would imply that $W_{56}$ should be equal to $W_{65}$ and (79) shows that this is not necessarily the case.

In order to find the conversion coefficient $S_{21n}$ in the case of intermediate storage resonant transfer, it is however such impedance parameters as $W_{33}$, $W_{34}$, $W_{43}$ and $W_{44}$ identifying the overall transmission between terminals 3–3' and terminals 4–4', i.e. (18) and (19) which must be found. These can be calculated in terms of like parameters corresponding the networks $N_{0A}$ and $N_{0B}$ of FIG. 2 as well as in terms of the parameters $W_{55}$, $W_{56}$, $W_{65}$ and $W_{66}$ which relate to the central part of the network $N_0$. However, for the present purpose of finding the conditions which must be satisfied by so-called universal filters which can operate equally well for resonant transfer as well as for intermediate storage resonant transfer transmissions, it may be assumed that the direct resonant transfer networks $N_{0A}$ and $N_{0B}$ of FIG. 2 do not introduce any losses so that $U_3$ is equal to $U_5$ while $U_4$ is equal to $U_6$. Also, in view of the directions of the currents indicated in FIG. 2, the related currents $J_3$ and $J_5$ are equal to one another and this is also true of the related currents $J_4$ and $J_6$. This means that (75) and (76) directly lead to $$U_3 = W_{55} J_3 + W_{56} J_4 \tag{80}$$

$$U_4 = W_{65} J_3 + W_{66} J_4 \tag{81}$$

By direct analogy with (37), the conversion coefficient $S_{21n}$ defining the transmission from terminals 1–1′ to terminals 2–2′ may now be written in terms of the impedance parameters defined by (77), (78) and (79), i.e.

$$S_{21n} = \frac{2\sqrt{R_1 R_2}\, W_{65} M_1(p) M_2(p+nP) e^{-nPT_1}}{(W_{55}+Z_{p3})(W_{66}+Z_{p4}) - W_{56}W_{65}} \quad (82)$$

If the source shown in FIG. 1 is now assumed to be connected across terminals 1–1′ is now assumed to be connected across terminals 2–2′, the conversion coefficient $S_{12n}$ characterizing the transmission in the reverse direction may be written as $$S_{12n} = \frac{2\sqrt{R_1 R_2}\, W_{56} M_1(p+nP) M_2(p)}{(W_{55}+Z_{p3})(W_{66}+Z_{p4}) - W_{56}W_{65}} \quad (83)$$

In the above the denominator does not differ from that of $S_{21n}$ given by (82) in view of its symmetry and in the numerator, $W_{56}$ replaces $W_{65}$, $M_1$ is a function of $p+nP$, $M_2$ is a function of $p$, in view of $S_{12n}$ characterizing the reverse sense of transmission. Also, recalling that the factor $e^{-nPT_1}$ appears in the expression (34) for $I_{2n}$ but not in the expression (33) for $I_{1n}$, this factor disappears in the numerator of the expression (83). Since it will be the modulus of $S_{21n}$ and that of $S_{12n}$ which will actually be of interest to characterize the transmissions, in view of such an equation as (58) expressing the square of the modulus of $M_1$ as the ratio between the resistance $R_3$ and the resistance $R_1$ and bearing in mind the remark after Equations 63, 64 and 65 to the effect that $R_3$ should be equal to $R_4$ in the case of an ideal filter for single sideband modulation by direct resonant transfer, it is clear that the difference between $S_{21n}$ and $S_{12n}$ depends on the value of the factor $$\frac{W_{56}}{W_{65}} e^{nPT_1}$$

This factor may be written as $$\frac{W_{56}}{W_{65}} e^{PT_n 1} = e^{\frac{nPT}{2} - (2p+nP)\frac{T_2-T_1}{2} - (a_2-a_1)}$$

$$= (-1)^n e^{-(2p+nP)\frac{T_2-T_1}{2}} \quad (84)$$

in which the first expression for the factor follows from (79) after some re-arrangement of the terms appearing in the exponent and bearing in mind, e.g. FIG. 2, that T is equal to $T_1+T_2$. The second expression follows by recalling that (9) identifies PT/2 as $j\pi$ so that $$e^{\frac{nPT}{2}}$$

is equal to $+1$ or $-1$ depending on whether $n$ is even or odd. Also, in the second expression (84) $a_2$ has been made equal to $a_1$.

This last condition can readily be satisfied if $R'_0$ is large enough. Then, the dimensionless parameters $a_1$ and $a_2$ are either both zero if $R_0$ and $S_0$ are absent or they can readily be made equal to one another if $S_0$ is closed during appropriate lengths of time occupying part of the intervals $T_1$ and $T_2$ respectively, i.e., equal lengths of time of the same resistance $R_0$ is introduced by the closure of $S_0$ both during $T_1$ and $T_2$. The resistances $R_0$ introduced across $C_0$ during part of the time intervals $T_1$ and $T_2$ may either be positive in which case $a_1$ and $a_2$ are also positive, or they may be negative in which case $a_1$ and $a_2$ are negative whereby the voltage amplitude $V_0$ may be increased instead of decreased during such time intervals separating the closures of the switches $S_3$ and $S_4$.

Considering the second expression of (84), it is thus clear that provided $a_1$ is equal to $a_2$ including the particular case when both are equal to 0, the only difference between $S_{21n}$ and $S_{12n}$ is a delay $$\frac{T_2-T_1}{2}$$

for the signal of frequency corresponding to $p$ and a like delay for the signal of frequency corresponding to $p+nP$, such delays being independent of frequency.

Thus, while an intermediate storage resonant transfer circuit like that of FIG. 2 is not a reciprocal circuit arrangement since this would imply strict equality between the conversion coefficients $S_{12n}$ and $S_{12n}$, the only difference between these two coefficients characterizing transmissions in reverse directions is only a delay and in general, such circuits whether they involve variable elements as for the intermediate storage circuit of FIG. 2, or not, will be termed quasi-reciprocal. Assuming that the intermediate storage resonant transfer circuit of FIG. 2 is quasi-reciprocal so that $a_1$ is equal to $a_2$, and more particularly since ideal conditions have to be determined that both $a_1$ and $a_2$ are equal to zero, the impedance parameters $W_{55}$, $W_{56}$ and $W_{65}$ identified by (77), (78) and (79) may be replaced into (82) giving $$S_{21n} = (-1)^n$$

$$\frac{2\sqrt{R_1 R_2}\, M_1(p) M_2(p+nP) R_{C0} e^{(p+nP)\frac{T_2-T_1}{2}}}{(Z_{p3}Z_{p4}+R_{C0}^2)\sinh\frac{pT}{2} + R_{C0}(Z_{p3}+Z_{p4})\cosh\frac{pT}{2}}$$

(85)

But the exponential factor in the above, corresponding to a delay, and the plus or minus sign depending on the parity of $n$ disappear when considering the square of the modulus of $S_{21n}$ which can be expressed from (85) as $$|S_{21n}|^2 =$$

$$\frac{4R_{C0}^2 R_3(\omega) R_4\left(\omega+\frac{2n\pi}{T}\right)}{\left|j(Z_{p3}Z_{p4}+R_{C0}^2)\sin\frac{\omega T}{2} + R_{C0}(Z_{p3}+Z_{p4})\cos\frac{\omega T}{2}\right|^2}$$

$$= \frac{4R_{C0}^2 R_{p3} R_{p4}}{4R_{C0}^2 R_{p3} R_{p4} + \left|j(R_{C0}^2 - Z_{p3}\bar{Z}_{p4})\sin\frac{\omega T}{2} + R_{C0}(Z_{p3}-\bar{Z}_{p4})\cos\frac{\omega T}{2}\right|^2}$$

(86)

The first expression which is given readily follows from (85) using (58) for the equare of the modulus of $M_1$ and a like relation for the square of the modulus of $M_2$, while $p$ is replaced by $j\omega$. For abitrary values of the real and imaginary parts of the pulse impedances $Z_{p3}$ and $Z_{p4}$, of $R_{C0}$ and of $\omega$, i.e. for any given value of the denominator of the first expression in (86) the latter will be maximum if (63) and (64) are satisfied. Then the first expression may be transformed into the second in which the denominator is now written out as a first term equal to the numerator plus a second term which is a perfect square. Clearly then, the modulus of $S_{21n}$ will again be maximum and in fact equal to unity when this second term in the denominator is equal to 0. Equating real and imaginary parts of this second denominator term, one obtains $$R_{C0}(R_{p3}-R_{p4}) = (X_{p4}R_{p3}-X_{p3}R_{p4})\tan\frac{\omega T}{2} \quad (87)$$

$$R_{C0}(X_{p3}+X_{p4}) = (R_{p3}R_{p4}+X_{p3}X_{p4}-R_{C0}^2)\tan\frac{\omega T}{2}$$

(88)

But when previously considering ideal filters for single sideband modulation by direct resonant transfer it has already been shown that $R_{p3}$ should be equal to $R_{p4}$ while the sum of $X_{p3}$ and $X_{p4}$ should be equal to zero, i.e. (65). In such a case, the above two relations directly lead to $$R_{p3} = R_{p4} = R_{C0} \quad (89)$$

$$X_{p3} = X_{p4} = 0 \quad (90)$$

Thus, filters such as the networks $N_1$ and $N_2$ of FIG. 1 which possess the property that the square of the modulus of their open circuit voltage transfer coefficients are defined by relations such as (58) while their pulse impedances such as $Z_{p3}$ are purely resistive and equal to a constant resistance in the passband may be termed universal ideal filters or more specifically universal ideal filters for single sideband modulation with resonant transfer. They will be equally effective whether the direct resonant transfer principle is used or whether intermediate storage is applied as described immediately above.

An analytical expression for a pulse impedance, such as $Z_{p4}$ may be obtained by considering that an impedance such as $Z_4(p)$ may be defined analytically by $$Z_4(p) = \sum_{i=1}^{N} \frac{B_i}{(p-p_i)\frac{T}{2}} \quad (91)$$

where N represents the degree of $Z_4(p)$ and $B_i$ are resistive constants so that using (17), (2) may be written $$R_{C2} = \frac{T}{2C_2} = \frac{T}{2}\lim_{p=\infty} pZ_4(p) = \sum_{i=1}^{N} B_i \quad (92)$$

In (91), the N poles $p_i$ of $Z_4(p)$ are assumed to be all distinct. An expression for $Z_4(p)$ and a corresponding one for $Z_{p4}$ could also be obtained when multiple poles are considered, but in practice these will generally not be encountered for such impedances as $Z_4(p)$.

With $Z_4(p)$ defined as above, an analytical expression for the pulse impedance $Z_{p4}$ may readily be obtained from Equations 17 and 18 in the previously mentioned article by adding these two expressions and multiplying by $T/2$, i.e. half the sampling period:

$$Z_{p4} = \sum_{i=1}^{N} \frac{B_i}{\tanh(p-p_i)\frac{T}{2}}$$

$$= \sum_{i=1}^{N} \frac{1 - \tanh\frac{pT}{2}\tanh\frac{p_iT}{2}}{\tanh\frac{pT}{2} - \tanh\frac{p_iT}{2}} B_i$$

$$= -\sum_{i=1}^{N} B_i \tanh\frac{p_iT}{2} + \sum_{i=1}^{N} \frac{B_i \operatorname{sech}^2\frac{p_iT}{2}}{\tanh\frac{pT}{2} - \tanh\frac{p_iT}{2}} \quad (93)$$

clearly showing that with $Z_4(p)$ a function of $pT/2$, the pulse impedance is a function of $\tanh pT/2$, the third form of $Z_{p4}$ emphasizing the fact that it is an analytical function of $\tanh pT/2$.

When the transformed variable $\tanh pT/2$ is equal to unity, (93) and (92) indicate that $Z_{p4}$ is equal to $R_{C2}$.

Using then a known theorem on bounded functions and transposing it to positive real functions, it can be proved that if a pulse impedance such as $Z_{p4}$ is equal to a constant resistance for a given frequency interval having a length distinct from zero, then this constant value must necessarily be that particular constant value $R_{C2}$ to which the pulse impedance $Z_{p4}$ is equal for a particular value of the variable $$\tanh\frac{pT}{2}$$

i.e.

$$\tanh\frac{pT}{2} = 1$$

If the networks $N_1$ and $N_2$ of FIG. 1 are such universal ideal filters for single sideband modulation by direct resonant transfer, i.e. if $$Z_{p3} = R_{p3} = R_3(\omega) = R_{C1} \quad (94)$$

$$Z_{p4} = R_{p4} = R_4\left(\omega + \frac{2\pi n}{T}\right) = R_{C2} \quad (95)$$

together with (58) and a corresponding relation for $M_2$ are satisfied within the respective passbands of the filters, then remembering that $T_1$ is equal to zero for the direct resonant transfer, the modulus of $S_{21n}$ defined by (37) can be expressed in the general case of the equivalent network of FIG. 9 in terms of the parameters $B_0$ and $B_S$ as $$|S_{21n}| = \frac{2\sqrt{R_1R_2}W_{43}|M_1(p)| \, |M_2(p+nP)|}{(W_{33}+Z_{p3})(W_{44}+Z_{p4}) - W_{34}W_{43}}$$

$$= \frac{B_0 - B_S}{2} \quad (96)$$

where the very simple second expression simply equal to half the difference between $B_0$ and $B_S$ is obtained by making use of (94), (95) together with (59), (60), (61) and finally (58) for the modulus of $M_1$ as well as an analogous expression for the modulus of $M_2$.

The dimensionless parameters $B_0$ and $B_S$ defined by (49) and (50) are similar to such parameters as $B_{33}$ previously defined by (38) and the modulus of $B_0$ as well as that of $B_S$ cannot exceed unity. This is true if the 4-terminal network $N_{01}$ of FIG. 5 is passive. One must note first of all that the impedances $Z_0$ and $Z_S$ characterizing this 4-terminal network and on which $B_0$ and $B_S$ respectively depend, each become the impedance of the capacitance $C_1$ at high frequency. Thus, considering for instance the impedance $Z_0$ and assuming that it is devoid of energy, if at a given instant a current impulse is applied thereto such that the voltage at its input terminals i.e. across $C_1$ is instantaneously carried to unit value then at a time $t_1$ later the voltage across the same terminals will be precisely given by $B_0$, i.e. (49). Thus, the fact that $Z_0$ is passive leads to the modulus of $B_0$ being smaller or equal to unity and an identical relation is true for $B_S$ in view of $Z_S$ being also passive.

If the resonant transfer network of FIG. 1 is unbalanced, i.e. with terminals 3' and 4' directly interconnected, the instantaneous voltage $v_a$ between terminals 3 and 4 immediately after closure of the switches $S_1$ and $S_2$ can be expressed in terms of the instantaneous voltage $v_b$ between these terminals immediately before opening of the switches by $$v_a = v_{3a} - v_{4a} = (B_{33} - B_{43})v_{3b} + (B_{34} - B_{44})v_{4b}$$
$$= B_S(v_{3b} - v_{4b}) = B_S v_b \quad (97)$$

The first expression follows from the definition of $v_a$, $v_{3a}$ and $v_{4a}$ being the instantaneous voltages across terminals 3–3' and 4–4' respectively after closure of the switches. The second expression is obtained with the help of (3) and (4), $v_{3b}$ and $v_{4b}$ being the instantaneous voltages across terminals 3–3' and 4–4' respectively before closure of the switches. The third expression is derived by using (50) and the last follows from the definition of $v_b$.

Likewise, with $q_a$ and $q_b$ the respective instantaneous total charges across $C_1$ and $C_2$ after and before closure of the switches:

$$q_a = C_1 v_{3a} + C_2 v_{4a}$$
$$= (C_1 B_{33} + C_2 B_{43})v_{3b} + (C_1 B_{34} + C_2 B_{44})v_{4b}$$
$$= B_0(C_1 v_{3b} + C_2 v_{4b}) = B_0 q_b \quad (98)$$

by again using (3) and (4) as well as (45) to (48).

Thus, since neither the modulus of $B_S$ nor that of $B_0$ can exceed unity for passive networks, as expected, the moduli of $v_b$ and $q_a$ cannot exceed those for $v_b$ and $q_b$ respectively.

When the resonant transfer network of FIG. 4 does not lead to such values as 1 and −1 for the dimensionless parameters $B_0$ and $B_S$ respectively, these parameters are nevertheless constants, so that the loss (for passive networks) is constant and independent of the frequency.

A general theory of resonant transfer transmissions has now been established. This covers not merely reciprocal circuits such as direct resonant transfer circuits but also so-called quasi-reciprocal ciruits such as intermediate storage resonant transfer circuits where the transmissions in the two opposite directions differ only by a pre-determined delay.

Figure 10:
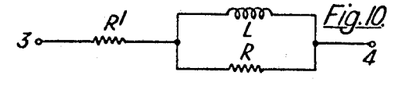
FIG. 10, a 2-terminal network which may constitute the resonant transfer network $N_0$ of FIG. 4 when coupled between terminals 3 and 4 thereof and with terminals 3' and 4' directly interconnected.

FIG. 10 shows a 2-terminal network illustrating the above and consisting of an inductance L shunted by a resistance R with this combination in series with a further resistance R' and as indicated, this 2-terminal network is connected between terminals 3 and 4. Thus, it may be substituted for the general network $N_0$ of FIG. 4 and the complete network of that last figure is thus composed solely of the capacitance $C_1$ and $C_2$ for the two shunt branches between terminals 3–3' and 4–4' respectively and of the 2-terminal network of FIG. 10 for the series branch between terminals 3 and 4, terminals 3' and 4' being directly coupled to one another. Relating such a practical resonant transfer network to the general equivalent circuit of FIG. 7 which uses the parameters $Z_0$ and $Z_S$ in addition to $C_1$ and $C_2$ one may write $$C_1 Z_0 = \frac{1}{p} \quad (99)$$

$$\frac{(C_1+C_2)Z_0 Z_S}{C_2(Z_0-Z_S)} = R' + \frac{pLR}{pL+R} \quad (100)$$

The first of these directly gives $Z_0$ while the second may be used to derive an explicit value for $Z_S$ using (99) and more precisely an explicit expression for $C_1 Z_S$, i.e.

$$C_1 Z_S = \frac{p+n_1+\omega_1 \tan \alpha_1}{(p+n_1)^2+\omega_1^2} \quad (101)$$

wherein auxiliary parameters $n_1$, $\omega_1$, and $\alpha_1$ have been introduced to replace the original parameters R, R' and L as well as the combined capacitance of $C_1$ and $C_2$ in series. These parameters, $n_1$, $\omega_1$ and $\alpha_1$ are identified by $$2n_1 = \frac{RR'}{L(R+R')} + \frac{C_1+C_2}{C_1 C_2(R+R')} \quad (102)$$

$$2\omega_1 \tan \alpha_1 = \frac{RR'}{L(R+R')} - \frac{C_1+C_2}{C_1 C_2(R+R')} \quad (103)$$

$$n_1^2+\omega_1^2 = \frac{(C_1+C_2)R}{LC_1 C_2(R+R')} \quad (104)$$

Since $Z_0$ and $Z_S$ are now defined the dimensionless parameters $B_0$ and $B_S$ given by (49) and (50) may be calculated, i.e.

$$B_0 = L_{t_1}^{-1}(C_1 Z_0) = L_{t_1}^{-1}\left(\frac{1}{p}\right) = 1 \quad (105)$$

$$B_S = L_{t_1}^{-1}(C_1 Z_S) = L_{t_1}^{-1}\left[\frac{p+n_1+\omega_1 \tan \alpha_1}{(p+n_1)^2+\omega_1^2}\right]$$

$$= e^{-n_1 t_1} \frac{\cos (\omega_1 t_1 + \alpha_1)}{\cos \alpha_1} \quad (106)$$

Thus, since $Z_0$ is constituted by a mere capacitance, i.e. $C_1$, the inverse Laplace transform of $C_1 Z_0$ is equal to unity but for $B_S$, to obtain the ideal value $-1$ the parameter $n_1$ depending on the losses will be made equal to zero. This implies that R' (FIG. 10) is equal to zero while simultaneously R is infinite. In such a case $\omega_1 t_1$ is an odd multiple of $\pi$ preferably equal to $\pi$. If only this last condition for the angular frequency $\omega_1$ is satisfied, then $B_S$ will be equal to $-e^{n_1 t_1}$ and accordingly the larger the losses of the circuit of FIG. 10, the more $B_S$ will divert from the ideal value of $-1$ towards 0.

Thus, while losses in the resonant transfer network $N_0$ of FIG. 1 will reflect themselves in an overall transmission loss for this circuit used for direct resonant transfer with simultaneous closures of the switches $S_1$ and $S_2$, when the two capacitances are connected to filters $N_1$ and $N_2$ loaded by resistive terminations $R_1$ and $R_2$ respectively, the overall transmission characteristic will not be made frequency dependent. It can also be shown that this remains true for an intermediate storage resonant transfer circuit (FIG. 2).

But it will now be demonstrated that this is not the case for a circuit using the capacitance $C_2$ unloaded, e.g. for the purpose of energy sampling.

Figure 11:
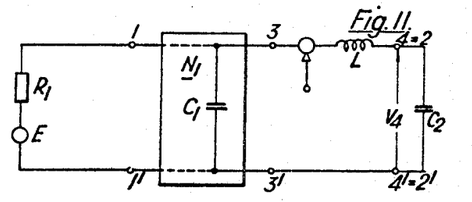
FIG. 11, a resonant transfer circuit without load across the output receiving capacitor, and FIG. 12, a circuit which is a transposed equivalent of that of FIG. 11 in the same way as FIG. 3 shows a circuit which is a transposed equivalent of that of FIG. 1.

FIG. 11 shows such a circuit which is of the direct resonant transfer type mentioned at the beginning of the description and this circuit is analogous to that already represented in FIG. 1 except that the resonant transfer network $N_0$ and the switches $S_1$ and $S_2$ are here materialized by the electronic gate S which replaces the two switches $S_1$ and $S_2$ and which is simply in series with the inductance L. However, there is no filter network $N_2$ and no resistive termination $R_2$ so that the terminals 4–4' are united with the terminals 2–2'. Whatever circuit (not shown) is connected across capacitance $C_2$ will be assumed to have a high input impedance such as that offered by a buffer amplifier. For such a circuit as that of FIG. 11, as previously considered, the impedance of capacitance $C_1$ is the impedance $Z_0$ found in FIG. 7 while the series impedance between terminals 3 and 4 of that figure corresponds to that of the series inductance L in FIG. 11. Hence, (105) is satisfied which means that for the particular network of FIG. 11, the interconnecting circuit of FIG. 9 is reduced to a simple series resistance between terminals 3 and 4.

Figure 12:
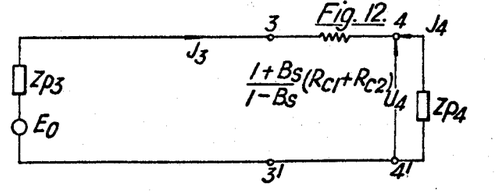

FIG. 12 shows the pulse impedance interconnecting circuit corresponding to that of FIG. 11 and on the basis of the representation given in FIG. 3 for the general case. Hence, the equivalent open circuit voltage $E_0$ of network $N_1$ is simply in series with the pulse impedance $Z_{p3}$, followed by the equivalent series resistance between terminals 3 and 4 and finally by the pulse impedance $Z_{p4}$ which is simply the pulse impedance of the capacitance $C_2$.

In the absence of a load across capacitance $C_2$, the previously defined conversion coefficient $S_{21n}$ loses its significance. A voltage conversion coefficient $S_a$ can however be defined as the ratio between the voltage $V_{4a}$ and the voltage E, $V_{4a}$ having previously been defined in relation to (4). This voltage conversion coefficient may be written $$S_a = \frac{V_{4a}}{E} = \frac{U_4 - R_{C2}J_4}{E} = \frac{U_4 + R_{C2}J_3}{E}$$

$$= \frac{(Z_{p4}+R_{C2})J_3}{E}$$

$$= \frac{Z_{p4}+R_{C2}}{E} \cdot \frac{E_0}{Z_{p3}+Z_{p4}+\frac{1+B_S}{1-B_S}(R_{C1}+R_{C2})} \quad (107)$$

In the above, the first expression is that of the definition, the second follows immediately from the difference between the expressions (11) and (13), the third expression for $S_a$ is due to the sum of $J_3$ and $J_4$ being obviously zero, the fourth is obtained from (15) while the fifth and last expression for $S_a$ follows from the replacement of $J_3$ by its value in terms of the elements of the equivalent circuit of FIG. 12. In this last expression, the ratio between the open circuit voltage $E_0$ and the source voltage E may be eliminated in terms of the open circuit voltage transfer coefficient $M_1$ from terminals 1–1' to terminals 3–3', i.e. (32) and (57) so that if an expression for the square of the modulus of $S_a$ is sought, this will be proportional to $R_3/R_1$. This leaves the two pulse impedances $Z_{p3}$ and $Z_{p4}$ as the two quantities still to be considered in (107).

If the network $N_1$ is realized as a universal ideal filter of the type previously discussed so that while the open circuit voltage transfer coefficient $M_1$ is equal to the square root of the real part $R_3$ of the open circuit input impedance $Z_3$ divided by the terminating resistance $R_1$, the pulse impedance $Z_{p3}$ is, in the passband, equal to this pure resistance $R_3$, which as previously mentioned, must necessarily be equal to the resistance $R_{C1}$.

The pulse impedance $Z_{p4}$ corresponding to the impedance $$Z_4 = \frac{1}{pC_2}$$

of the capacitance $C_2$ is readily obtained from (93), N being equal to 1, $p_1$ to 0 and $B_1$ to $R_{C2}$ in view of (92), i.e.

$$Z_{p4} = \frac{B_1}{\tanh \frac{pT}{2}} = -jR_{C2} \cot \frac{\omega T}{2} \quad (108)$$

Using these results, the following expression for the square of the modulus of this voltage conversion coefficient $S_a$ can be obtained $$|S_a|^2 = \frac{\frac{R_{C1}}{R_1}}{1 + \frac{4}{(1-B_S)^2}\left(B_S + \frac{R_{C1}}{R_{C2}}\right)\left(1 + \frac{R_{C1}}{R_{C2}}\right)\sin^2 \frac{\omega T}{2}} \quad (109)$$

This shows clearly that when $B_S$ is equal to $-1$ (no losses) the response is independent of frequency with $R_{C1}$ equal to $R_{C2}$ or in other words with equal capacitances $C_1$ and $C_2$. If however due to losses, $B_S$ departs from $-1$ then with equal capacitances $C_1$ and $C_2$, $S_a$ will diminish as the frequency increases.

But, provided the ratio of the capacitances is suitably chosen, i.e.

$$\frac{R_{C1}}{R_{C2}} = \frac{C_2}{C_1} = -B_S \quad (110)$$

a flat transmission characteristic can be retained as in the case of no losses when $B_S$ is equal to $-1$. While this means that the output voltage across terminals 4–4' can be kept equal to the value corresponding to the case of no losses, there will nevertheless be an energy loss due to the resistive elements of FIG. 10 which are associated with the inductance L, i.e. the losses of the coil itself plus the equivalent resistance of the gate S (FIG. 11). This additional energy loss will thus correspond to the ratio between the capacitances $C_2$ and $C_1$, $C_2$ being of course smaller than $C_1$ when positive elements are considered. But the important result is achieved that this overall transmission loss being flat there will be no distortion depending on the frequency. The actual ratio between $C_2$ and $C_1$ can readily be computed since $B_S$ in (110) is equal to $-e^{n_1 t_1}$ appearing in (106) provided $\omega_1 t_1$ is equal to $\pi$. The parameter $n_1$ is given by (102) and in the particular case where the second term of this expression can be neglected with regard to the first, the equation for $C_1/C_2$ is no longer transcendental. In such a case if R is sufficiently large with regard to R' one may write $$t_1 \frac{R'}{L} = \log_e \frac{C_1}{C_2} \quad (111)$$

defining the ratio between the two capacitances and at the same time the flat loss.

While formula (109) clearly shows that if losses are present in the resonant transfer circuit so that the value of $B_S$ departs from $-1$ it is nevertheless possible to secure a flat transmission characteristic in function of frequency, by a suitable choice of the ratio between capacitances $C_2$ and $C_1$, the formula also indicates that if another part of the transmission circuit already introduces some distortion in function of frequency and particularly a response which falls as the frequency increases, it will be possible to compensate the latter. Indeed, irrespective of whether $B_S$ is different from $-1$ or not, provided $$B_S + \frac{R_{C1}}{R_{C2}}$$

is negative, (109) indicates that the response will increase as the frequency increases so that it would be possible to compensate an opposite effect in another part of the transmission circuit. Since the characteristic defined by formula (109) is only present when the receiving output capacitance $C_2$ is unloaded, the arrangement cannot be used in a time division multiplex system with the capacitance $C_2$ being a common capacitance for the various time slots using the same highway. But the arrangement can nevertheless be used in time division multiplex systems provided an individual capacitance $C_2$ is retained for each time slot. In other words, in addition to the gate S shown in FIG. 11 on the left of the capacitance $C_2$, a second gate (not shown) must be provided on the right of the capacitance $C_2$ in order that the voltage sample stored across $C_2$ can be communicated to a common high input impedance device such as a PCM coder.

Even if another part of the transmission circuit does not introduce frequency distortion, the arrangement of FIG. 11 might also be found useful if frequency distortion must deliberately be introduced at some part of the transmission system. Such a case is described in the U.S. Patent No. 2,621,251 previously referred to at the beginning of the description, where pre-emphasis is introduced at the coding end of a PCM transmission in order to reduce quantization noise. This may be provided by the arrangement of FIG. 11 provided a separate capacitance $C_2$ is allotted to each time slot. Considering the denominator of the formula (109) it is a linear function of a $$\sin^2 \frac{\omega T}{2}$$

and may be written as $$1 + \frac{4}{(1-B_S)^2}\left(B_S + \frac{R_{C1}}{R_{C2}}\right)\left(1 + \frac{R_{C1}}{R_{C2}}\right)\sin^2 \frac{\omega T}{2} = 1 - A \sin^2 \frac{\omega T}{2} \quad (112)$$

where A is a constant to which a predetermined negative value may be assigned provided $$B_S + \frac{R_{C1}}{R_{C2}}$$

is negative. Thus, recalling (16) and (17), when $B_S$ is equal to $-1$, the constant A may be written as $$A = 1 - \left(\frac{C_2}{C_1}\right)^2 \quad (113)$$

and the required pre-emphasis can be secured with $C_2 < C_1$. At the receiving side of the system an arrangement similar to that of FIG. 11 may be foreseen but this time, the factor corresponding to A should be negative, e.g. $C_2$ should be larger than $C_1$ if there are no losses in the resonant transfer circuit. Again care will be taken to provide individual capacitances $C_2$ per time slot. These may for instance be connected via an individual gate (not shown) to a common high input impedance amplifier. In such a manner, with pre-emphasis at the sending end and de-emphasis at the receiving end, the overall frequency characteristic of the system may be defined by $$\left(1 - A \sin^2 \frac{\omega T}{2}\right)\left[1 + \frac{A \sin^2 \frac{\omega T}{2}}{1 - A \sin^2 \frac{\omega_0 T}{2}}\right] \quad (114)$$

wherein the first factor indicates that the attenuation diminishes with frequency whereas the second factor shows an attenuation with increases with frequency provided A is positive and that $$A \sin^2 \frac{\omega_0 T}{2}$$

is smaller than unity. Considering this formula, it is readily seen that the particular angular frequency $\omega_0$ introduced therein defines the angular frequency at which the overall attenuation factor is again unity as it was when $\omega$ is equal to zero. In between, the expression (114) will deviate from unity to an extent which depends on the required degree of pre-emphasis. The maximum deviation above unity will occur at the angular frequency $\omega_0/2$ and this will be equal to $$\frac{A^2 \sin^2 \frac{\omega_0 T}{2}}{A\left(1 - A \sin^2 \frac{\omega_0 T}{2}\right)} \quad (115)$$

This same deviation but this time below unity will be encountered when the angular frequency reaches the value $$\frac{1+\sqrt{2}}{2} \omega_0$$

While the above method to secure pre-emphasis will necessitate separate capacitances $C_2$ per time slot as well as an individual gate for such capacitances if they are to be connected to a common high input impedance device, frequency response shaping devices individual per station are avoided.

It will be clear that although capacitances have been indicated as reactive energy storage devices, inductive elements might eventually be used especially when multiplex circuits are not used and that the rules of duality, e.g. voltage interchanged with current, series connection interchanged with parallel connection, impedance interchanged with admittance, etc., are then applicable.

While the principles of the invention have been described above in connection with specific apparatus, it is to be clearly understood that this description is made only by way of example and not as a limitation on the scope of the invention.

What is claimed is:

1. A resonant transfer network for transferring energy under the control of time controlled gates to reactive loads from energy source means including internal resistance means, first reactance means connected to said energy source for storing a certain amount of energy received from said energy source, said first reactance means having a first reactive value when viewed from the input of said network, second reactance means for receiving, storing and transferring said certain amount of energy, said second reactance means coupled to a high impedance load whereby said second reactance means is unloaded, said second reactance means having a second reactive value when viewed from the output of said network, said second reactive value being smaller than said first reactive value, and interconnecting means including highway means having an input to output amplitude ratio that is no greater than unity for repeatedly interconnecting the first and second reactance means through said network for effecting the transfer of the certain amount of energy stored in said first reactance means to said second reactance means.

2. The resonant transfer network of claim 1 wherein said first and second reactance means comprises first and second capacitances respectively, means for permanently interconnecting said capacitances at one terminal, wherein said interconnecting means comprises means interconnecting said capacitances at the other terminal for an effective interconnecting time period, said second capacitance being smaller than said first capacitance, and wherein the negative of the ratio of said capacitances is equal to the ratio of the difference of the voltage across said capacitances at the end of said effective time period and said difference at the start of said time period, whereby a flat frequency response in the transfer characteristic between said first and second capacitances is provided.

3. The resonant transfer network of claim 2 wherein the ratio of said second capacitance divided by said first capacitance is equal to $e^{n_1 t_1}$ wherein $n_1$ is the negative real part of complex conjugate roots of the resonant transfer network and $t_1$ represents the effective interconnecting time period, and wherein $w_1 t_1 = \pi$.

4. The resonant transfer network of claim 1 wherein the difference between said first reactive value and said second reactive value provides a frequency dependent response in the transfer characteristic between said first and said second reactance means, said response being inversely proportional to a linear function of $$\sin^2 \frac{wT}{2}$$

where $w$ is the angular frequency and $T$ is the repetition period of the effective interconnecting time period.

References Cited

UNITED STATES PATENTS 3,117,185  1/1964  Adelaar _____________ 179—15

RALPH D. BLAKESLEE, Primary Examiner